(12) United States Patent
Siemer et al.

(10) Patent No.: US 8,056,888 B2
(45) Date of Patent: Nov. 15, 2011

(54) HYDRAULIC BEARING WITH BIAXIAL DAMPING

(75) Inventors: Hubert Siemer, Dinklage (DE); Susanne Brokamp, Wallenhorst (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 897 days.

(21) Appl. No.: 12/060,338

(22) Filed: Apr. 1, 2008

(65) Prior Publication Data

US 2008/0246199 A1      Oct. 9, 2008

(51) Int. Cl.
    *F16M 5/00*       (2006.01)
(52) U.S. Cl. .......... 267/140.5; 267/140.11; 267/140.12; 267/140.13
(58) Field of Classification Search .................. 267/120, 267/140.11, 140.12, 140.13, 140.5, 219; 248/556, 562, 566, 636, 638
See application file for complete search history.

(56) References Cited

U.S. PATENT DOCUMENTS

| | | | |
|---|---|---|---|
| 4,936,556 A * | 6/1990 | Makibayashi et al. ... | 267/140.13 |
| 5,356,121 A * | 10/1994 | Ikeda ....................... | 267/140.12 |
| 5,595,373 A * | 1/1997 | Ikeda ....................... | 267/140.12 |
| 5,690,320 A | 11/1997 | Kanda | |
| 6,029,961 A * | 2/2000 | Meyerink et al. ........ | 267/140.12 |
| 6,443,438 B2 * | 9/2002 | Satori et al. .............. | 267/140.13 |
| 6,663,090 B2 * | 12/2003 | Simuttis et al. .......... | 267/140.13 |
| 6,981,696 B2 * | 1/2006 | Hatano et al. ............. | 267/140.12 |
| 7,044,455 B2 * | 5/2006 | Yoshida et al. ........... | 267/140.13 |
| 7,314,213 B2 * | 1/2008 | Tanaka ....................... | 267/140.5 |

FOREIGN PATENT DOCUMENTS

| | | |
|---|---|---|
| DE | 19624886 C2 | 1/1997 |
| DE | 69705381 T2 | 11/1997 |
| DE | 100 37 954 A1 | 12/2001 |
| DE | 103 34 901 A1 | 2/2005 |

\* cited by examiner

*Primary Examiner* — Robert Siconolfi
*Assistant Examiner* — Mariano Sy
(74) *Attorney, Agent, or Firm* — Norris McLaughlin & Marcus, P.A.

(57) ABSTRACT

A hydraulic bearing with biaxial damping with an axial and radial damping characteristics essentially independent of one another. The hydraulic bearing including a housing and an axially and radially operating elastomeric damping arrangement received therein. Several chambers are adapted to receive a hydraulic damping device and formed, with respect to the axial and radial orientation of the bearing, in pairs, with each chamber pair interconnected by at least one channel. The upper housing section is constructed as a support body including an inner core, and the outer wall of the upper housing section radially separated from the inner core, and a spring connected with the inner core and the outer wall by vulcanization. The hydraulic bearing is modular, wherein the chambers affecting the radial damping are part of a bush bearing which is inserted in the support body as a separate component and non-positively and/or positively connected thereto.

16 Claims, 4 Drawing Sheets

HYDRAULIC BEARING WITH BIAXIAL DAMPING

BACKGROUND OF THE INVENTION

The invention relates to a hydraulic bearing, or elastomeric support, which is provided with hydraulic damping through an arrangement of chambers that receive damping means, wherein at least two chambers are always interconnected by at least one channel. More particularly, the invention is directed to a hydraulic bearing with biaxial damping configured to dampen both axial as well as radial vibrations introduced in the mount.

Different designs of elastomeric bearings or rubber mounts are used for damping vibrations transmitted between connected parts of an assembly. (The terms "support", "mount" and "bearing" will be used interchangeably in the context of the present specification and claims). Such bearings are used in large quantities particularly the automotive industry where they are employed, for example, as bearing bushings in the steering column linkage or as support for other chassis parts. Such bearing bushings are predominantly constructed to dampen radially introduced vibrations. Conversely, bearings with predominantly axial damping characteristics are employed, for example, as engine mounts for supporting the engine of the motor vehicle. Since it is desirable to further improve the driving comfort, in particular with respect to annoying vibrations and noise, simultaneous damping of radially introduced vibrations has become increasingly important in the engine mounts that were originally designed mainly for axial damping. Accordingly, biaxial bearings providing excellent damping characteristic for both axial and radial vibrations have been developed.

In particular, elastomeric bearings are frequently provided with hydraulic damping for damping vibrations with large amplitudes. To this end, at least two chambers receiving damping means are arranged in the body of the elastomeric bearing and interconnected by a channel formed in the bearing. In bush bearings, corresponding chambers are arranged in the radially outer regions of the bearing body and distributed along its circumference, whereas in axially damping bearings, the chambers are superpositioned in the axial direction.

However, hydraulic bearings with biaxial damping with a hydraulic component for both the axial damping direction and the radial damping direction are known in the art. Such hydraulic bearings with biaxial damping are disclosed, for example in DE 100 37 954 A1 and DE 103 34 901 A1. The bearings are constructed such that their elastomeric support spring simultaneously forms a part of an axially damping bearing as well as of a radially damping bearing. All the working chambers, namely the chambers for the axially damping bearing and the chambers for the radially damping bearing as well as the elastomeric support spring, form a one-piece component. However, this approach has the disadvantage that parameters which are important for the functionality in both damping directions (axial and radial) are directly dependent of one another and cannot be specified separately due to the one-piece design. In fact, any change in a desired axial damping characteristic of the elastomeric bearing body directly affects also its radial damping characteristic, and vice versa.

SUMMARY OF THE INVENTION

It is therefore an object of the invention to construct a hydraulic bearing with biaxial damping with axial and radial damping characteristics that can be defined substantially independent of one another and adapted to the respective desired application.

The object is attained by a hydraulic bearing with biaxial damping with the features of the independent claim. Advantageous embodiments and modifications of the biaxial mount according to the invention are recited in the dependent claims.

The proposed hydraulic bearing with biaxial damping is constructed of a housing with an upper housing section and a connected lower housing section and an elastomeric damping arrangement received in the housing operating axially and radially. For hydraulic bearing of the damping in both the axial and radial directions, the aforementioned elastomeric damping arrangement includes several chambers receiving a hydraulic damping means. The chambers are, in relation to the axial and radial direction of the bearing, arranged in pairs, and the chambers of each pair are interconnected by at least one channel. The chambers of at least one chamber pair are arranged with respect to one another in the axial direction, whereas the chambers of at least one additional chamber pair are arranged with respect to one another in the radial direction and distributed along the circumferential direction of the hydraulic bearing.

The upper housing section of the proposed hydraulic bearing is, in a manner known in the art, formed as a support body consisting of an inner core, an outer wall of the upper housing section spaced from the inner core, and an elastomeric spring connected with the inner core and the outer wall by vulcanization. The inner core is supported in the axial direction against the outer wall of the upper housing section by the elastic spring. According to the invention, the hydraulic bearing with biaxial damping configured in this manner is constructed in modular form. The chambers effective for the radial damping are preferably part of a bush bearing which can be combined with the support body and are inserted into the support body as separate component and non-positively and/or positively connected with the support body. The bush bearing consists of a cylindrical inner part, a cage radially spaced from the inner part, and a support body arranged between and connected with the inner part and the cage by vulcanization. Accordingly, a quasi separate component is formed inside the hydraulic bearing with biaxial damping of the invention with damping characteristic that can then be adjusted substantially independently of the axial damping characteristic of the overall arrangement. Bush bearings having different radial damping characteristics can hence be combined, i.e., non-positively and/or positively connected, with the support body of the hydraulic bearing of the invention.

According to an advantageous embodiment of the invention, the bush bearing with radial damping characteristics commensurate with requirements of the particular application is connected with the inner core of the support body. Preferably, the outer wall of the upper housing section and the inner core of the support body are arranged concentric with one another. The cage of the bush bearing and its inner part are also arranged concentric with one another. According to one variant, the inner core of the axially operating support section and the inner part of the bush bearing are in contact with each other and are interconnected non-positively and/or positively by riveting and/or flanging. According to another variant, a section of the inner core of the axially operating bearing section projects both into the support body and into the, in this embodiment, hollow-cylindrical inner part of the bush bearing received by the support body. The components in this variant are joint by a non-positive and/or positive connection of the inner part of the bush bearing with the inner core of the support body of the axially operating bearing part. For example, the inner core and the inner part are connected by a screw. This may be implemented, for example, by disposing inside the hollow cylinder formed by the inner part of the bush bearing a web, with the web connecting the inside walls of the hollow cylinder and extending in the radial direction. Alternatively, the hollow cylinder may be interrupted by a radially extending intermediate plane, and the web or the aforementioned intermediate plane may have a through opening adapted to receive a screw connecting the inner core of the support body and the inner part of the bush bearing. For mass or series production, a connection of the inner core to the inner part by flanging or riveting is preferred over the last-described variant.

The channel interconnecting the radially operating chambers may be formed, for example, on the interior surface of the outer wall of the upper housing section or the support body, respectively. Preferably, this channel is formed in a channel support element of the bush bearing. According to an advantageous embodiment of the invention, this channel support element is clipped onto the cage vulcanized into the support body in the region of the outer circumference of the bush bearing. Alternatively, the channel support surrounding the cage may also have a two-part construction in the axial direction. Advantageously, the embodiments with the channel support surrounding the cage, but also the basic embodiment of the bearing of the invention, may be modified by forming, in addition to the channel connecting the radially operating chambers, an additional throttle channel operating as a bypass. In the corresponding embodiment of the bearing, a blocking element is arranged in the throttle channel which blocks the throttle channel in normal operation and only opens the throttle channel if the radial load of the chambers of the bush bearing exceeds a predetermined load maximum.

In one embodiment, the axially operating hydraulic system is implemented by arranging in the bearing housing two radially extending channel plates, which separate the axially operating chambers from one another by forming a working chamber and an equalization chamber. The channel interconnecting the axially operating chambers is formed by the particular profile of the outer surfaces of these channel plates. The channel has corresponding channel openings both towards the working chamber and towards the equalization chamber. According to a modification of this embodiment, the channel support formed by the channel plates, which separates the chambers of the axially or vertically operating hydraulic system, with reference to the typical installation position of the hydraulic bearing, may include an opening in which an elastomeric element supported between the channel plates is inserted. By selecting a suitable material for this elastomeric element, the volume spring formed by this elastomeric element has a soft spring characteristic for vibrations introduced in the support in the axial direction and strikes a limit stop for vibrations of high frequency and small amplitude, decreasing the spring deflection. A different stiffness can be attained with respect to high- and low-frequency vibrations, or with respect to vibrations with small amplitude or large amplitudes by adjusting the volume compliance of the volume spring. In this way, a bearing with advantageous spring characteristic as well as good acoustic decoupling can obtained.

According to an advantageous embodiment, the bearing includes a throttle channel forming a bypass to the channel that connects the axially operating chambers. In this case, too, like with the bypass provided in addition to the channel that connects the radially operating chambers, a blocking element is arranged in the throttle channel which only opens the channel if the axial load of the hydraulic bearing exceeds a predetermined load maximum. Optionally, the bypass can also be formed by disposing in the volume spring of the aforedescribed embodiment a slit which passes the damping means only when the volume spring has a spring compression similar to a bypass.

The bearing can also be constructed such that its stiffness in the axial direction can be switched by electric switching means and actuators operated by the switching means. By employing such switching means, for example, a bypass of the axially operating channel which is otherwise closed by a membrane can be, as necessary, electrically operated or opened by electronic control, thereby abruptly changing the damping and/or the stiffness. A similar operation can be achieved with an electrically operated element, which alternatingly opens and closes an opening for discharge of air from or inflow of air to the equalization chamber.

The lower housing section of the hydraulic bearing according to the invention, which is also used for installing and connecting the bearing to corresponding structural parts of an assembly receiving the bearing, is preferably trough-shaped, with an opening towards the upper housing section. In a preferred application of the bearing as an engine mount, the bearing is connected to the vehicle chassis via the lower housing section formed in this manner, whereas the upper housing section forms a support body for the engine to be supported. According to a possible embodiment, the upper housing section and the lower housing section are connected by radially inwardly bending or flanging the axial end of the upper housing section or the outer wall of the support body facing the lower housing section, and by forming on the axial end of the lower housing section facing the upper housing section a corresponding flange or a radially outward pointing collar which engages behind the flanged portion of the upper housing section.

In another embodiment, for connecting the housing sections, the outside diameter of the axial end of the outer wall of the bearing body facing the lower housing section is enlarged, thereby forming a step which is enveloped from the outside by a portion of the lower housing section that is bent multiple times.

As already mentioned, an important advantage of the bearing of the invention is that the position and magnitude of the axial damping characteristic can be adjusted independent of the position and magnitude of the radial damping characteristic, and vice a versa. Important characteristic parameters, such as the volume compliance, the effective area, the channel cross-section and the channel length can be defined and adjusted for both the axial and the radial damping direction, without affecting the characteristic properties of that component in the respective other direction. The rubber hardness of the axially operating support body and of the bush bearing can then be selected independently of each other, so as to provide the assembled component with an optimum axial and radial static stiffness for the particular application. Moreover, independent amplitude-selective reductions in the stiffness in the aforedescribed damping assemblies can be implemented by selecting appropriate materials and dimensions for the elastomeric elements. It will be understood that the damping characteristics of the bush bearing may be adjustable with respect to the damping provided by the radially operating chambers and the damping provided by the chambers orthogonal to the radially operating chambers. According to an advantageous embodiment, the inner part may have a cross-sectional area that is different from a circular shape. The particular modular construction of the hydraulic bearing advantageously enables independent adjustment of the damping characteristics in the principal load directions of the hydraulic bearing according to the invention.

With the modular construction, the elastomeric parts of the mount or its rubber components, respectively, advantageously have a simple shape and can hence be reliably manufactured. Accordingly, the complete support can be assembled by a highly reliable, conventional manufacturing process.

BRIEF DESCRIPTION OF THE DRAWINGS

The invention will now be described in more detail with reference to an exemplary embodiment. The appended drawings show in.

DETAILED DESCRIPTION OF THE PRESENTLY PREFERRED EMBODIMENTS

Figure 1:
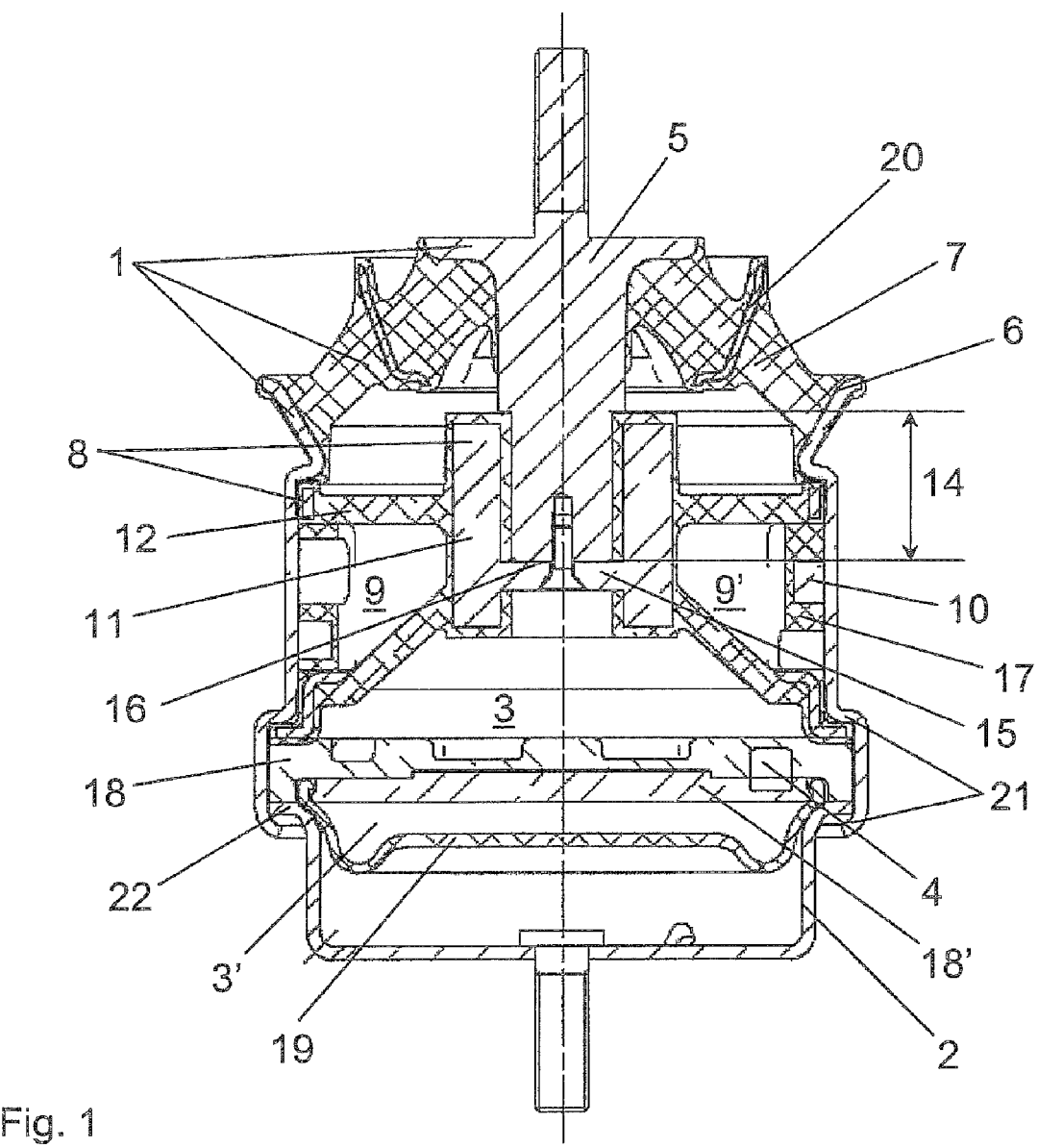
FIG. 1 an exemplary embodiment of the bearing of the invention in an axial cross-section.

FIG. 1 shows a potential embodiment of the hydraulic bearing of the invention in an axial cross-section through three radially operating chambers 9, 9'. The bearing essentially consists of an upper housing section 1 forming a support body in the axial direction a, the trough-shaped lower housing section 2 connected with the upper housing section 1, axially operating chambers 3, 3' disposed in the housing 1, 2 and separated from one another by channel plates 18, 18', and the bush bearing 8 inserted in the support body 1. The support body 1 is formed by the outer wall 6 of the upper housing section 1, an inner core 5 with a section 14 protruding into the support body 1, and an elastomeric spring 7, which is connected with the inner core 5 and the outer wall 6 of the upper housing section 1 through vulcanization. The inner core 5 is supported by the elastomeric spring 7 in the axial direction a against the outer walls 6 of the upper housing section 1. An insert 20 vulcanized into the elastomeric spring 7 of the support body 1 provides reinforcement.

Like in conventional engine mounts, a working chamber 3 is formed above the channel plates 18, 18' which extend in the housing 1, 2 in the radial direction r. The working chamber 3 in conjunction with the equalization chamber 3' disposed below the channel plates 18, 18' and the channel 4 connecting the chambers 3, 3' with one another forms an axially operating hydraulic damping system. The channel 4 is formed between the channel plates 18, 18' by a corresponding profile of the outer surfaces of the channel plates 18, 18' and has at least one channel opening toward each of the working chamber 3 and the equalization chamber 3'. The equalization chamber 3' into which the hydraulic damping means is displaced from the working chamber 3 through the channel 4 when an axial load is applied, is delimited on the side facing away from the channel plates 18, 18' by an inflatable elastomeric membrane 19 which is surrounded and protected by the trough-shaped lower housing section 2. The bearing is also mounted at the installation site via the lower housing section 2.

According to the modular construction of the hydraulic bearing, a module formed as an essentially complete bush bearing 8 is inserted in the support body 1 as a radially damping component. The bush bearing 8 is also equipped with a hydraulic system operating in the radial direction. The inner part 11 of the bush bearing 8, which consists of an elastomeric bearing body 12 joined with the inner part 11 by vulcanization, and an outer cage 13 which is also connected with the bearing body 12, is non-positively and positively connected with the support body 1. To this effect, the inner part 11 of the bush bearing 8 includes an intermediate plane 15 extending in the radial direction and having a through opening 16 in the axial direction a. The inner part 11 of the bush bearing 8 is connected with the inner core 5 of the support body 1 by a screw, with a section 14 of the inner core 5 projecting into both the support body 1 and the inner part 11 of the bush bearing 8. The channel 10 interconnecting the radially operating chambers 9, 9' is implemented in the bush bearing 8 as a channel support element 17 clipped onto the outer cage 13. As can be seen, the radial damping characteristic of the illustrated hydraulic bearing can be altered by exchanging the bush bearing 8 or by replacing the bush bearing 8 with a bush bearing having a different radial damping characteristic, essentially without affecting the axial damping characteristic of the entire assembly. This is a significant advantage is due to the modular construction of the hydraulic bearing of the invention.

Figure 2:
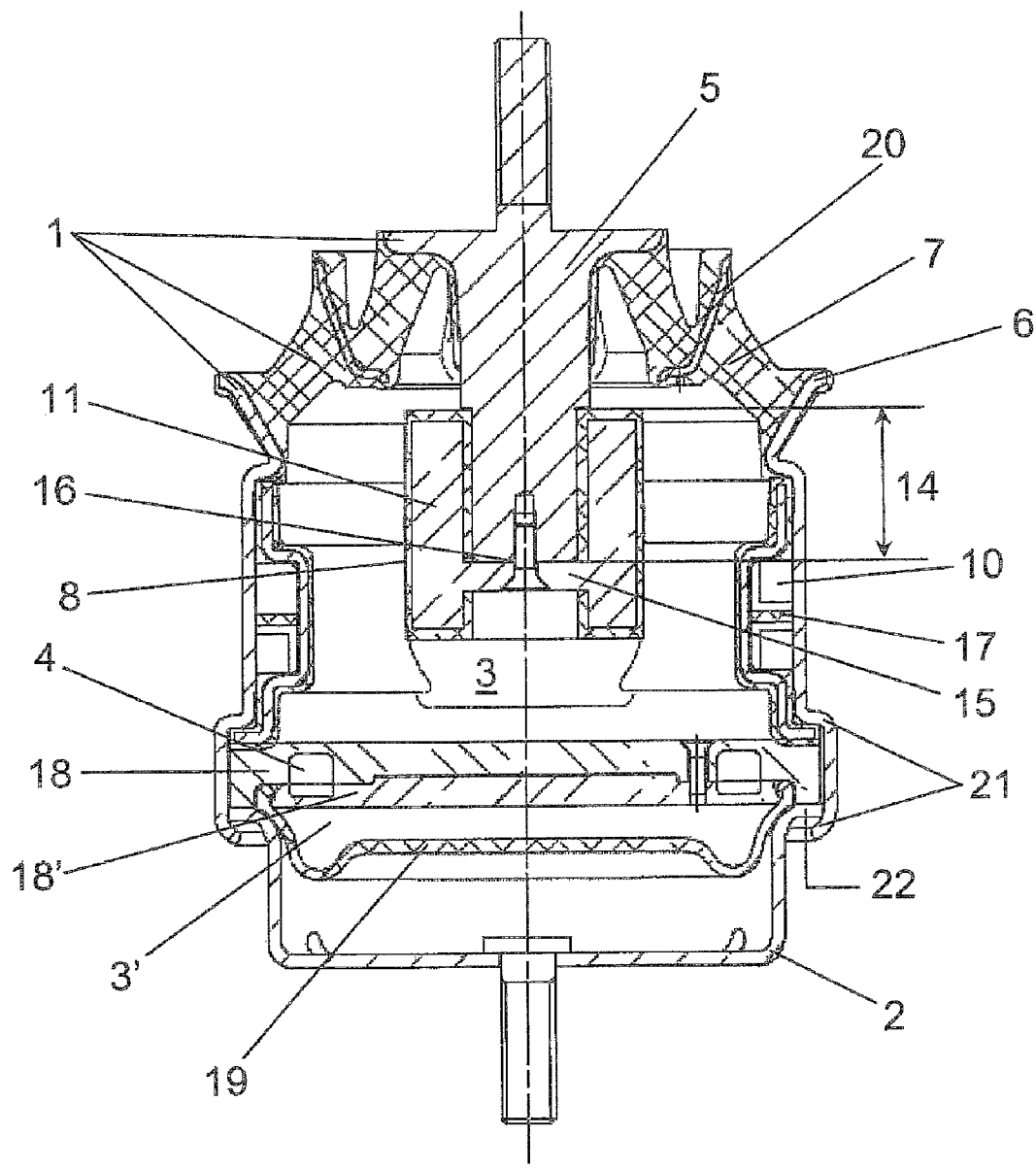
FIG. 2 the bearing according to the embodiment of FIG. 1 in an axial cross-section orthogonal to that of FIG. 1.

FIG. 2 shows the hydraulic bearing according to FIG. 1 in an axial cross-sectional view, wherein the cross-section of FIG. 2 is orthogonal to the axial cross-section of FIG. 1. As illustrated in FIG. 2, in this exemplary embodiment the inner part 11 is not connected by the elastomer of the bearing body 12 with the outer cage 13 in the direction orthogonal to the radially operating chambers 9, 9'. This results in a very small flexibility of the bearing in the radial operating direction. However, depending on the requirements in a particular application of the mount, the bearing can also be constructed, as known from genuine bearing bushings, with elastomeric webs disposed between the chambers 3, 3' in the circumferential the direction and connecting the inner part 11 with the outer cage 13.

Figure 3:
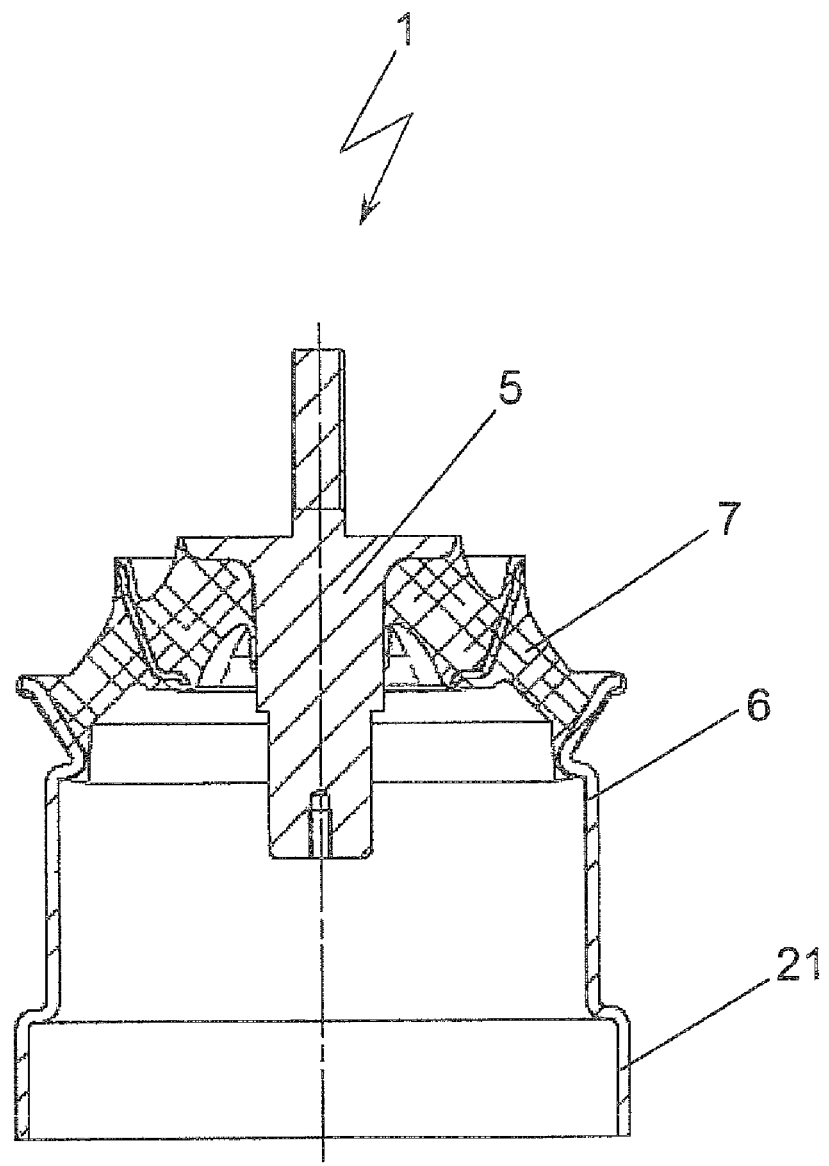
FIG. 3 the support body of the embodiment of FIG. 1 and FIG. 2 in an axial cross-section.

FIG. 3 shows once more the support body 1 of the bearing according to FIGS. 1 and 2 before the bush bearing 8 is installed and connected with the lower housing section 2. As seen in the likewise axial cross-sectional view, the inner core 5 of the upper housing section or support body 1, respectively, is supported against the outer wall 6 of the support body 1 in the axial direction a by the elastomeric spring 7. As already described above, both the inner core 5 and the outer wall 6 are connected with the elastomeric spring 7 by vulcanization.

Figure 4A:
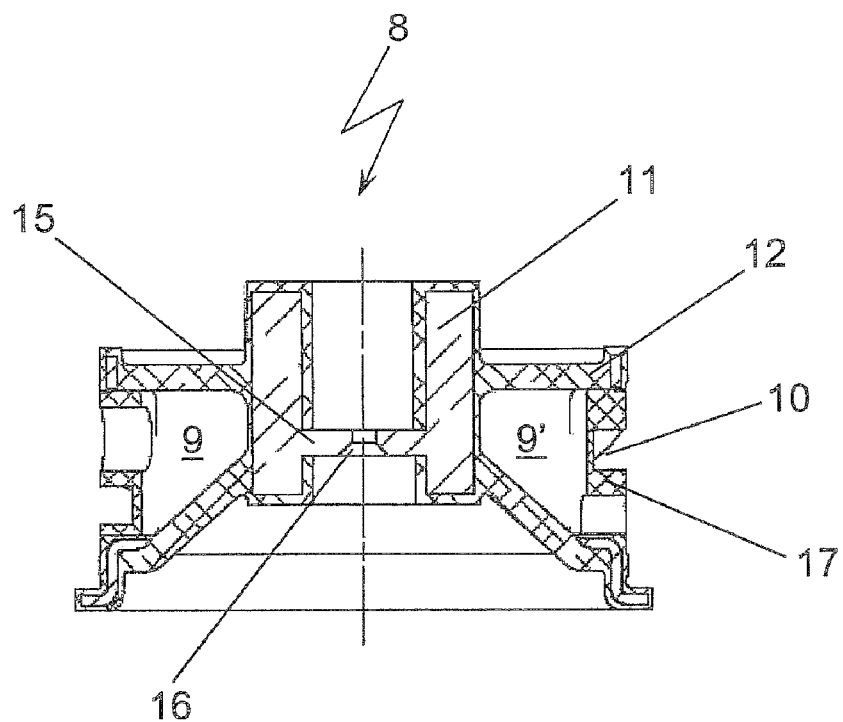
FIG. 4a the bush bearing of FIG. 1 in an axial cross-section through the radially operating chambers.
Figure 4B:
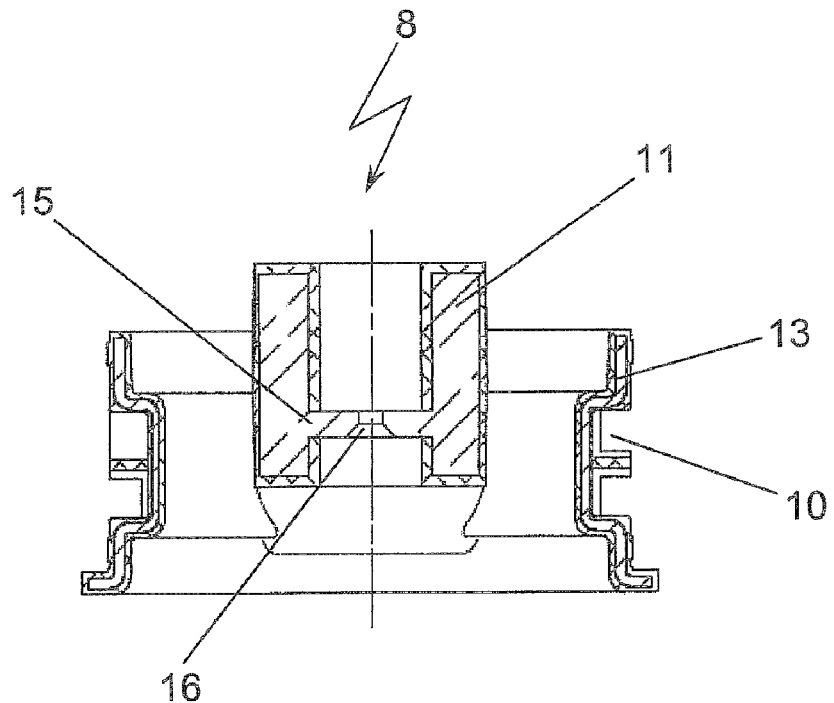
FIG. 4b the bush bearing of FIG. 4a in an axial cross-section orthogonal to the chambers.

FIGS. 4a and 4b show once more in an axial cross-sectional view the bush bearing 8 according to FIG. 1 or FIG. 2, respectively, constructed essentially as a separate component which is preferably employed as an engine mount. The cross-sectional view depicted in FIG. 4a extends through the radially operating chambers 9, 9' with the damping means which are enclosed by the elastomeric support body 12 and the outer cage 13, whereas FIG. 4b shows the bush bearing 8 in a likewise axial cross-sectional view which, however, has an orientation orthogonal to that of FIG. 4a. As can be seen once more, the exemplary embodiment of the hydraulic bearing of the invention does not include any webs or connections in the circumferential direction between the chambers 9, 9' for connecting the bearing body 12 with the cage 13. FIGS. 4a and 4b both show the channel 10 formed in the clipped-on channel support element 17 and connecting the two chambers 9, 9'.

| | List of reference symbols |
|---|---|
| 1 | upper housing section, support body |
| 2 | lower housing section |
| 3, 3' | (axially operating) chamber |
| | 3    working chamber |
| | 3'   equalization chamber |
| 4 | channel |
| 5 | inner core |
| 6 | outer wall |
| 7 | elastomeric spring |
| 8 | bush bearing |
| 9, 9' | (radially operating chambers) |
| 10 | channel |
| 11 | inner part |
| 12 | elastomeric bearing body |
| 13 | cage |
| 14 | section |
| 15 | web, intermediate plane |
| 16 | through opening |
| 17 | channel support element |
| 18, 18' | channel plate |
| 19 | membrane |
| 20 | insert |
| 21 | bent section |
| 22 | collar |
| a | axial direction |
| r | radial direction |
| u | circumferential direction |

The invention claimed is:

1. Hydraulic bearing with biaxial damping comprising a housing (1, 2) constructed of an upper housing section (1) and a lower housing section (2) connected to the upper housing section (1), and an elastomeric damping arrangement received in the housing (1, 2) and operating axially and radially, with the damping arrangement having at least one pair of chambers (3, 3') arranged in an axial direction and connected by a channel (4) and at least one pair of chambers (9, 9') arranged in a radial direction and distributed along a circumferential direction of the hydraulic bearing and connected by at least one channel (10) for a hydraulic damping means, wherein the upper housing section has an inner core (5), an outer wall (6) radially spaced from the inner core (5) and an elastomeric spring (7) which is connected to the inner core (5) in the axial direction against the outer wall (6), wherein the inner core (5), the outer wall (6) and the elastomeric spring (7) together form a support member, wherein the hydraulic bearing is constructed in modular form, in that the chambers (9, 9') form a component of a bush bearing (8) which is inserted into the support member as a separate component and non-positively and/or positively connected thereto, with the bush bearing (8) includes an inner part (11), a cage (13) radially spaced from the inner part (11), and a bearing body (12) with the chambers (9, 9') disposed between the inner part (11) and the cage (13) and connected with the inner part (11) and the cage (13) by vulcanization.

2. Hydraulic bearing with biaxial damping according to claim 1, wherein the bush bearing (8) is non-positively and/or positively connected with the inner core (5) of the support member.

3. Hydraulic bearing with biaxial damping according to claim 2, wherein the outer wall (6) of the upper housing section (1) and the inner core (5) as well as the cage (13) of the bush bearing (8) and its inner part (11) are arranged mutually concentrically to one another, and that the inner core (5) and the inner part (11) of the bush bearing (8) are in contact with each other and are non-positively and/or positively interconnected by riveting and/or flanging.

4. Hydraulic bearing with biaxial damping according to claim 2, wherein the outer wall (6) of the upper housing section (1) and the inner core (5) as well as the cage (13) of the bush bearing (8) and its inner part (11) are arranged mutually concentrically to one another, and that the inner core (5) protrudes with a section (14) into both the support member and a hollow cylinder formed by the inner part (11) of the bush bearing (8) received by the support member and the inner part (11) of the bush bearing (8) are non-positively and/or positively connected to the inner core (5).

5. Hydraulic bearing with biaxial damping according to claim 4, further comprising a web disposed within and connecting inner walls of the hollow cylinder formed by the inner part (11) of the bush bearing (8), or the hollow cylinder is interrupted by an intermediate plane (15), and that the inner part (11) with the inner core (5) is connected by a screw extending through an axial through opening (16) of the web or of the intermediate plane (15).

6. Hydraulic bearing with biaxial damping according to claim 5, wherein the channel (10) interconnecting the chambers (9, 9') is formed on an interior surface of the outer wall (6) of the support member receiving the bush bearing (8).

7. Hydraulic bearing with biaxial damping according to claim 5, wherein the channel (10) interconnecting the chambers (9, 9') is formed in a channel support element (17) of the bush bearing (8).

8. Hydraulic bearing with biaxial damping according to claim 7, wherein the channel support element (17) of the bush bearing (8) is clipped along its circumference onto the cage (13) which is vulcanized into the bearing body (12).

9. Hydraulic bearing with biaxial damping according to claim 7, wherein the channel support element (17) of the bush bearing (8) is formed in two parts, having a split in the axial direction (a), and surrounds the cage (13) which is vulcanized along its circumference into the bearing body (12).

10. Hydraulic bearing with biaxial damping according to claim 6, wherein the inner part (11) of the bush bearing (8) has a cross-sectional shape that is different from a circular shape.

11. Hydraulic bearing with biaxial damping according to claim 10, wherein two channel plates (18, 18') extending in the radial direction (r) are arranged in the housing (1, 2) with the channel plates (18, 18') separating the chambers (3, 3') by forming a working chamber (3) and a equalization chamber (3') and, due to a corresponding profile of the outer surfaces of the channel plates (18, 18'), enclosing between the channel plates (18, 18') the channel (4) which interconnects the chambers and has channel openings to the chambers (3, 3') wherein the axial side of the equalization chamber (3') facing away from the channel plates (18, 18') is delimited by an inflatable membrane (19).

12. Hydraulic bearing with biaxial damping according to claim 11, wherein a channel support is formed by the channel plate (18) and the channel plate (18') and separating the chambers (3, 3') has an opening.

13. Hydraulic bearing with biaxial damping according to claim 11, wherein the firmness of the hydraulic bearing in the axial direction can be switched.

14. Hydraulic bearing with biaxial damping according to claim 13, wherein one or several inserts (20) are vulcanized into the elastomeric spring (7) of the support member.

15. Hydraulic bearing with biaxial damping according to claim 14, wherein the axial end of the outer wall (6) of the upper housing section (1) facing the lower housing section (2) is bent radially inwardly, and the axial end of the upper housing section (2) facing the upper housing section (1) has a corresponding radially outwardly oriented collar (22) which engages behind the bent section (21) of the upper housing section.

16. Hydraulic bearing with biaxial damping according to claim 1, wherein the axial end of the outer wall (6) of the upper housing section (1) facing the lower housing section (2) has an enlarged outside diameter formed as a step, which is surrounded from the outside by a section of the lower housing section (2) bent multiple times.

* * * * *